(12) United States Patent
Ganapathi

(10) Patent No.: US 10,679,142 B2
(45) Date of Patent: Jun. 9, 2020

(54) DYNAMIC SEARCH GUIDANCE FOR MACHINE DATA INDEXING AND SEARCH SYSTEM

(71) Applicant: Splunk Inc., San Francisco, CA (US)

(72) Inventor: Archana Sulochana Ganapathi, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 949 days.

(21) Appl. No.: 15/142,346

(22) Filed: Apr. 29, 2016

(65) Prior Publication Data

US 2017/0316337 A1    Nov. 2, 2017

(51) Int. Cl.
| | | |
|---|---|---|
| *G06N 20/00* | (2019.01) | |
| *G06F 16/248* | (2019.01) | |
| *G06F 16/22* | (2019.01) | |
| *G06F 16/2455* | (2019.01) | |
| *G06N 5/04* | (2006.01) | |

(52) U.S. Cl.
CPC ......... *G06N 20/00* (2019.01); *G06F 16/2228* (2019.01); *G06F 16/248* (2019.01); *G06F 16/2455* (2019.01); *G06N 5/047* (2013.01)

(58) Field of Classification Search
CPC . G06N 20/00; G06F 16/2228; G06F 16/2455; G06F 16/248
See application file for complete search history.

(56) References Cited

U.S. PATENT DOCUMENTS

| | | | |
|---|---|---|---|
| 2005/0131847 A1 | 6/2005 | Weston et al. | |
| 2007/0094360 A1 | 4/2007 | Forlenza et al. | |
| 2007/0260597 A1* | 11/2007 | Cramer | G06Q 30/0244 |
| 2014/0074850 A1 | 3/2014 | Noel et al. | |
| 2015/0039651 A1 | 2/2015 | Kinsely et al. | |
| 2016/0162803 A1 | 6/2016 | Amershi et al. | |
| 2017/0193333 A1* | 7/2017 | Cavalin | G06K 9/00677 |
| 2017/0199875 A1* | 7/2017 | Nevrekar | G06F 16/24578 |

OTHER PUBLICATIONS

Dreilinger, Daniel, and Adele E. Howe. "Experiences with selecting search engines using nnetasearch." ACM Transactions on Information Systems (TOIS) 15.3 (1997): 195-222. (Year: 1997).*

(Continued)

*Primary Examiner* — Eric Nilsson
*Assistant Examiner* — Sehwan Kim
(74) *Attorney, Agent, or Firm* — Perkins Coie LLP

(57) ABSTRACT

Disclosed is a guidance technique that can be applied to guide search and analysis of stored data by a user. The technique can include inputting from a user a portion of a search query expressed in a pipelined search language, at a system for indexing and searching machine data. The system generates and outputs search guidance for the user as the user builds the search query, by applying the portion of the query to an operation flow model, where the operation flow model represents a plurality of searches performable by the system. The operation flow model has been generated based on multi-user historical search data and includes a plurality of states, each representing a different group of related commands of the pipelined search language.

25 Claims, 14 Drawing Sheets

(56) References Cited

OTHER PUBLICATIONS

Pirolli, Peter, Stuart K. Card, and Mija M. Van Der Wege. "The effects of information scent on visual search in the hyperbolic tree browser." ACM Transactions on Computer-Human Interaction (TOCHI) 10.1 (2003): 20-53. (Year: 2003).*

Siddiqi, Sajid M., Geogrey J. Gordon, and Andrew W. Moore. "Fast state discovery for HMM model selection and learning." Artificial Intelligence and Statistics. 2007. (Year: 2007).*

Chau, Michael, Xiao Fang, and Olivia R. Liu Sheng. "Analysis of the query logs of a web site search engine." Journal of the American Society for Information Science and Technology 56.13 (2005): 1363-1376. (Year: 2005).*

Alspaugh, Sara, and Archana Ganapathi. "Towards a data analysis recommendation system." Presented as part of the 2012 Workshop on Managing Systems Automatically and Dynamically. 2012. (Year: 2012).*

Alspaugh, Sara, et al. "Analyzing log analysis: An empirical study of user log mining." 28th Large Installation System Administration Conference (LISA14). 2014. (Year: 2014).*

Non-Final Office Action dated Oct. 18, 2018 for U.S. Appl. No. 15/050,785 of Sainani, M. et al. filed Feb. 23, 2016.

Bermudez-Chacon, Roger, et al., "Automatic problem-specific hyperparameter optimization and model selection for supervised machine learning", ETH Zurich Research Collection; Technical Report, 2015, pp. 1-53.

Garner, Stephen R., "WEKA: The Waikato Environment for Knowledge Analysis", Proceedings of the New Zealand Computer Science Research Students Conference, 1995, pp. 57-64.

Spiliopoulou, Myra, et al., "NOEMON: An Intelligent Assistant for Classifier Selection", FGML 1998, No. 11 in 1998, Dept. of Computer Science, TU Berlin, 1998, pp. 90-97.

Talbot, Justin, et al., "EnsembleMatrix: Interactive Visualization to Support Machine Learning with Multiple Classifiers", CHI 2009—Visualization 2, Apr. 8, 2009, pp. 1283-1292.

S. Alspaugh, "Data analysis interaction record analysis methodology," GitHub, Inc, [website] [retrieved on Jun. 3, 2016], retrieved from: <https://github.com/salspaugh/lupe/wiki/Data-analysis-interaction-record-analysis-methodology>, Nov. 24, 2014, 6 pages.

U.S. Appl. No. 15/050,785 of Sainani, M. et al. filed Feb. 23, 2016.

Final Office Action dated Apr. 24, 2019 for U.S. Appl. No. 15/050,785 of Sainani et al., filed Feb. 23, 2016.

Notice of Allowance dated Oct. 17, 2019 for U.S. Appl. No. 15/050,785 of Sainani et al., filed Feb. 23, 2016.

* cited by examiner

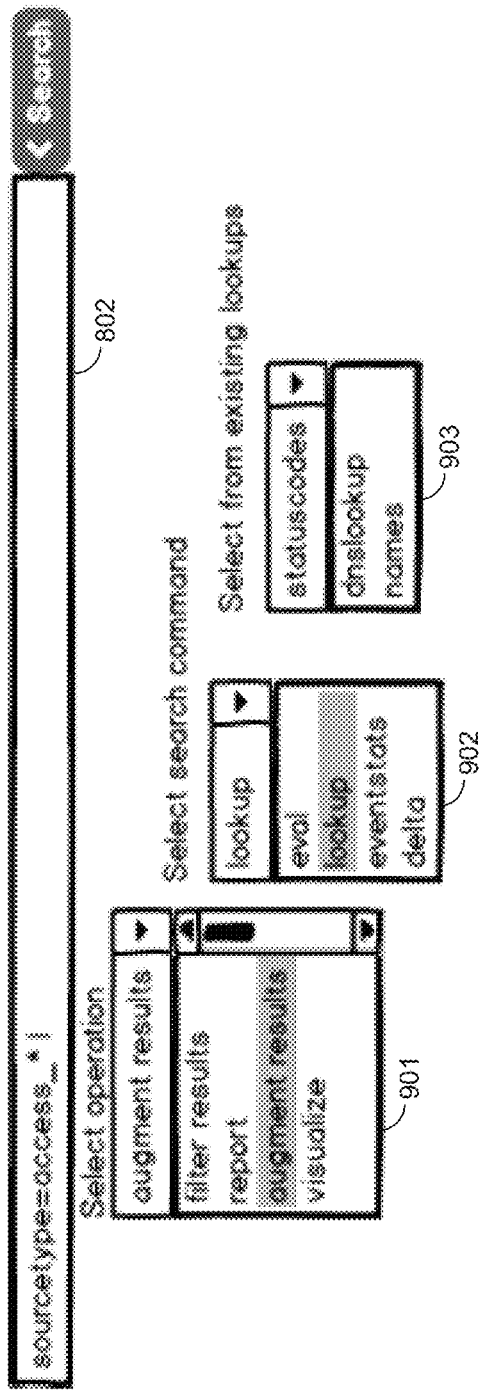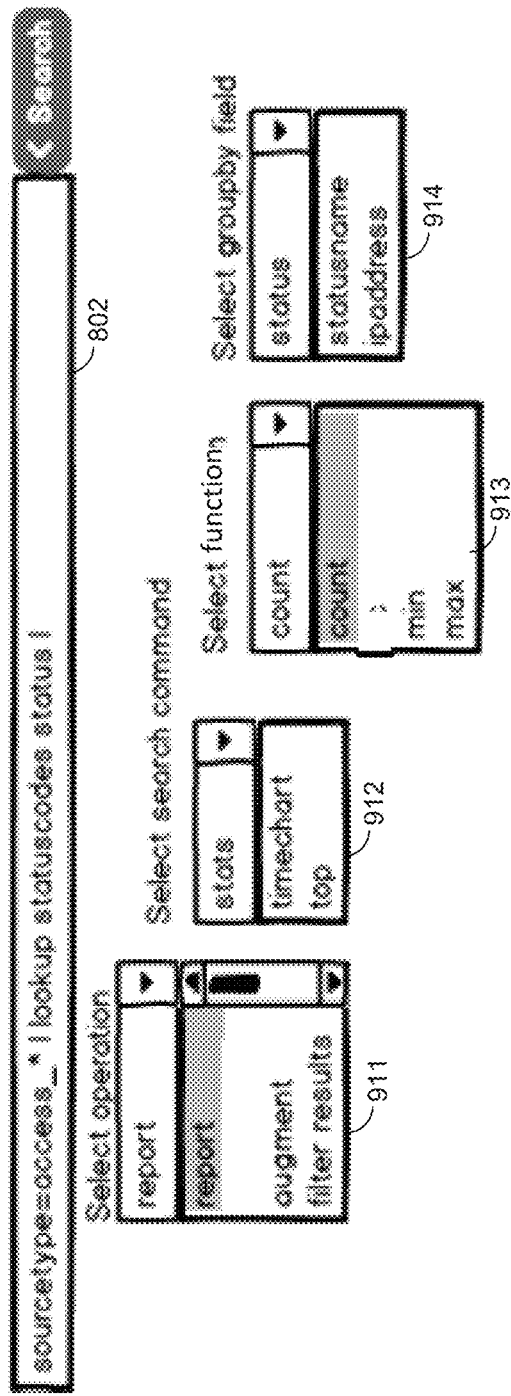

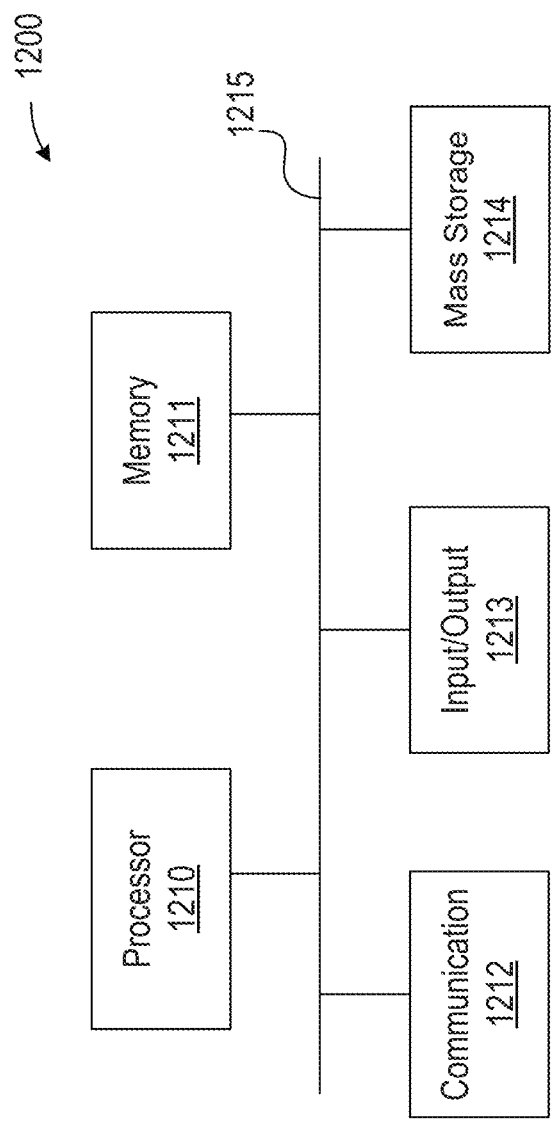

DYNAMIC SEARCH GUIDANCE FOR MACHINE DATA INDEXING AND SEARCH SYSTEM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

At least one embodiment of the present disclosure pertains to information organization and understanding, and more particularly, to the organization and understanding of machine data.

BACKGROUND

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data ("machine data"). In general, machine data can include performance data, diagnostic information and/or any of various other types of data indicative of performance or operation of equipment in a computing system. Such data can be analyzed to diagnose equipment performance problems, monitor user interactions, and to derive other insights.

A number of tools are available to analyze machine-generated data. In order to reduce the volume of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may, for example, enable an analyst to investigate different aspects of the machine data that previously were unavailable for analysis. However, analyzing and searching massive quantities of machine data presents a number of challenges.

BRIEF DESCRIPTION OF THE DRAWINGS

One or more embodiments of the present disclosure are illustrated by way of example and not limitation in the figures of the accompanying drawings, in which like references indicate similar elements.

FIG. 8A illustrates an example of a search screen of a search graphical user interface (GUI).

FIG. 8B illustrates an example of a data summary dialog of the search GUI.

FIG. 9A shows an example of a first search screen display including dynamic search guidance for the user.

FIG. 9B shows an example of a second search screen display including dynamic search guidance for the user.

FIG. 12 shows a high-level example of a hardware architecture of a processing system that can be used to implement any one or more of the functional components described herein.

DETAILED DESCRIPTION

Figure 1:
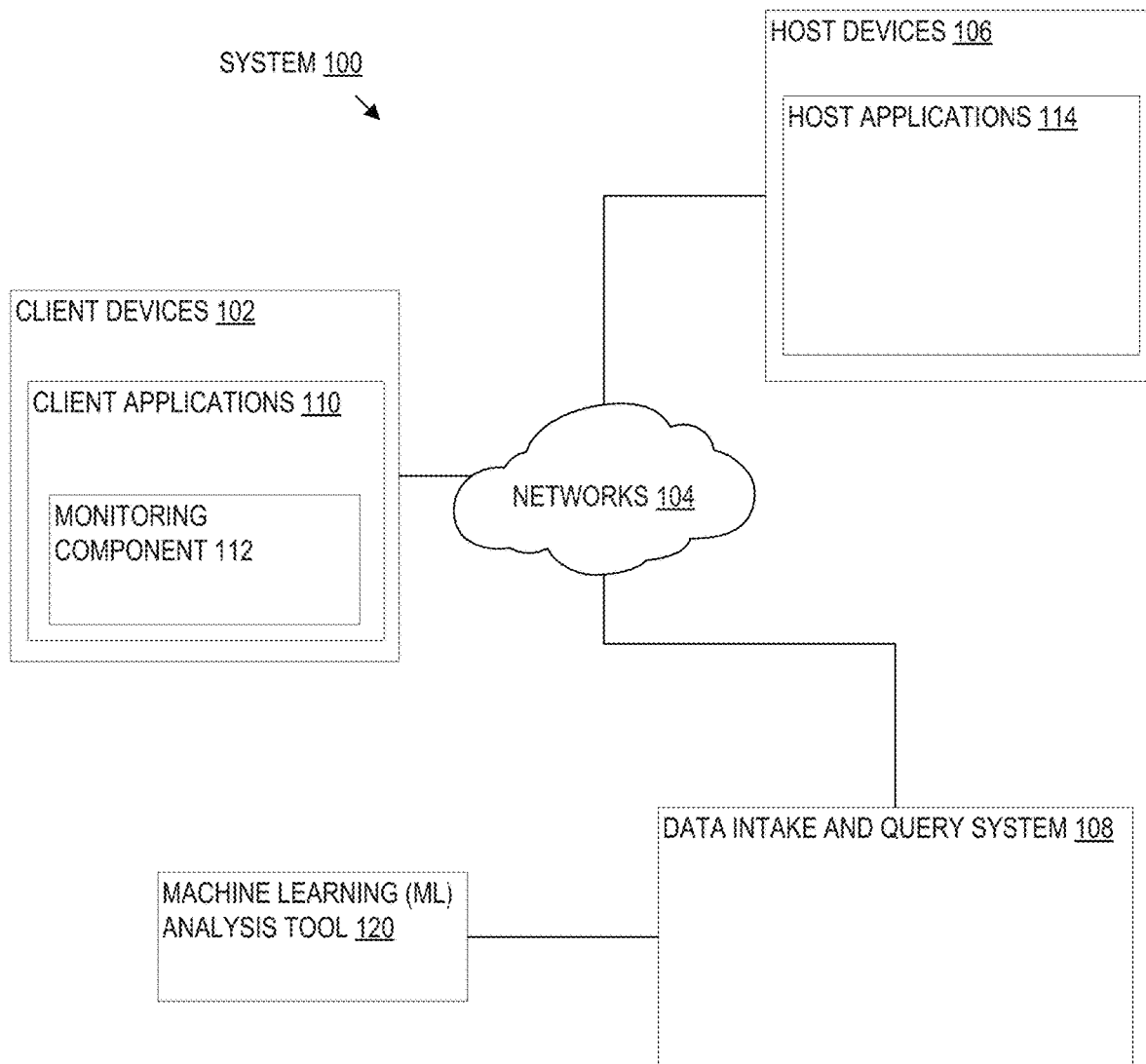
FIG. 1 illustrates a networked computer environment in which an embodiment may be implemented.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is a guidance technique that can be employed in a system that indexes and stores machine data, to facilitate a user's search and analysis of such data by use of a pipelined search language (PSL). The system that indexes and stores machine data is also referred to herein as a data intake and query system, or more simply as "the system." According to some embodiments, the guidance technique has a pre-processing phase categorizes/groups all possible search commands of the system into categories of commands that have certain common characteristics; these categories are referred to as "operations" in this description. The technique then generates one or more operation flow models to represent at least the most common search paths based on multi-user historical search data. Each state of such an operation flow model represents a different operation (group of related PSL commands), and each operation flow model can represent multiple historical search paths. In some embodiments the technique uses machine-learning models to categorize/group the PSL commands into categories (operations).

In certain embodiments, when a user selects a data source to search or analyze at run time, the data intake and query system identifies one or more of the operation flow models to use (e.g., based on the selected data source or the type of selected data source). As the user inputs a PSL search query, the system uses the identified operation flow model(s) to provide search guidance to the user dynamically, i.e., as the user builds the search query. This may include outputting recommendations of one or more next operations to be added to the query, and one or more selectable search commands represented by each operation. This may be done repeatedly and dynamically as the user progressively builds the PSL search query. The recommendations may appear in, for example, one or more pop-up drop-down menus next to the search bar as the user inputs the query. The system may also use metadata (e.g., fields) from partial search results as additional inputs to the operation flow model(s), for purposes of providing the dynamic search guidance.

Various other features of the guidance technique will become apparent from the description which follows. First, however, it is useful to consider an example of an environment and system in which the guidance technique may be employed, as will now be described.

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources.

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference herein in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
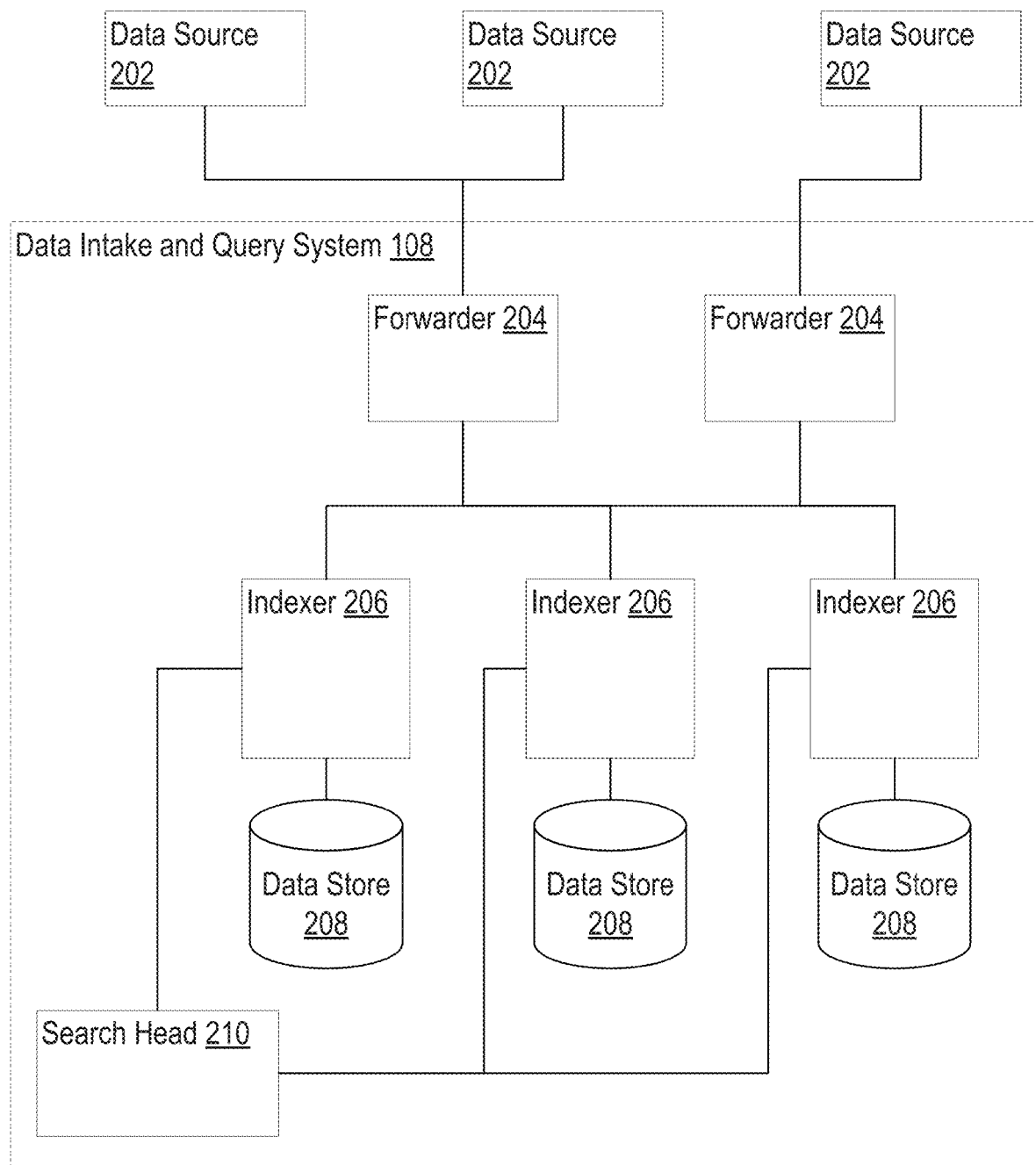
FIG. 2 illustrates a block diagram of an example data intake and query system in which an embodiment may be implemented.

FIG. 2 depicts a block diagram of an illustrative data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
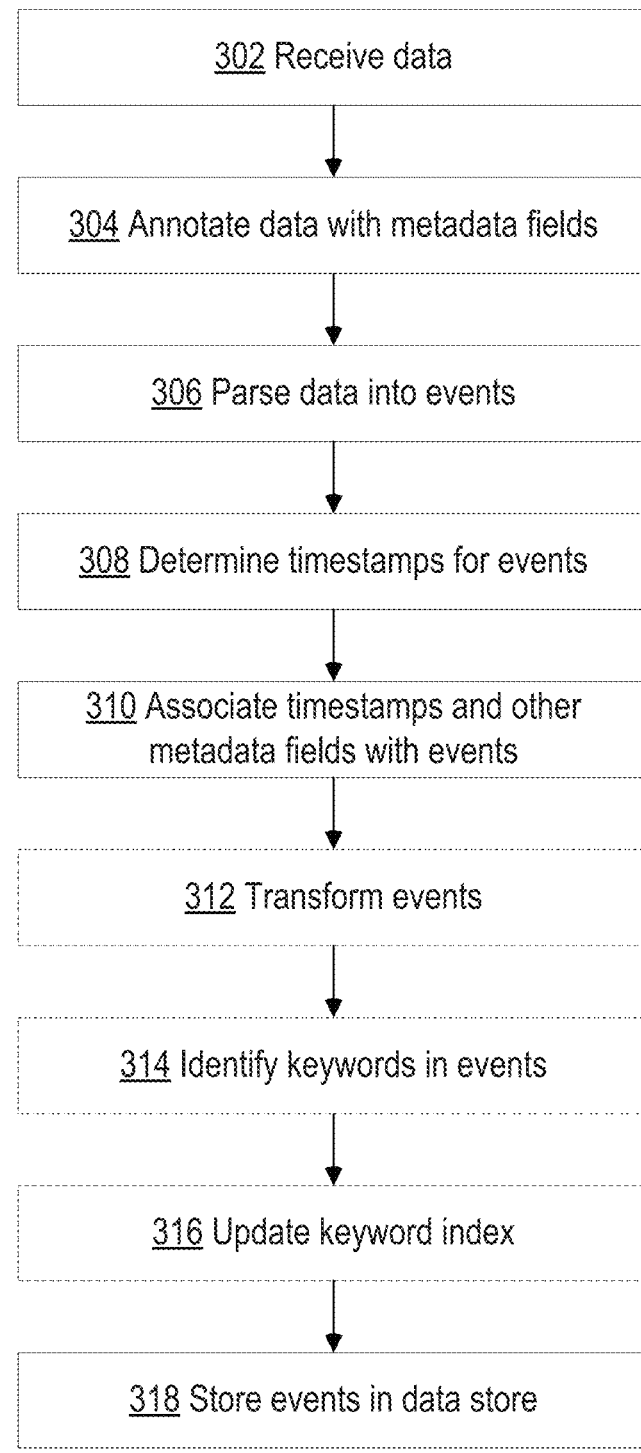
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. Pat. No. 9,130,971, entitled "SITE-BASED SEARCH AFFINITY", filed on 30 Apr. 2014, and in U.S. Pat. No. 9,124,612, entitled "MULTI-SITE CLUSTERING", also filed on 30 Apr. 2014, each of which is hereby incorporated by reference in its entirety for all purposes.

2.6. Query Processing

Figure 4:
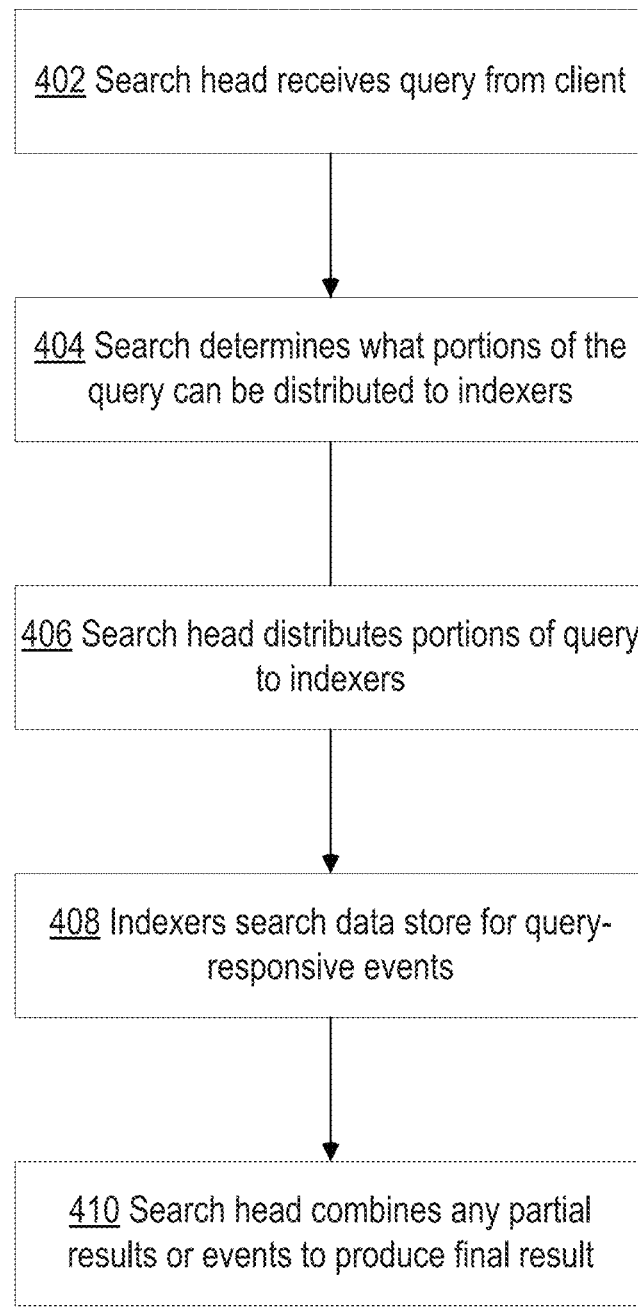
FIG. 4 is a flow diagram that illustrates how a search head and indexers perform a search query.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

2.8 Search Guidance

The system 100 can include or be used in conjunction with a search guidance technique, as described briefly above. The guidance technique is described herein primarily as guiding the search and analysis of data by a user. Note, however, that the technique can alternatively or additionally be applied for other purposes, such as to guide the search GUI or to optimize the PSL itself, as described further below.

The guidance technique has a preprocessing phase and a runtime phase. The preprocessing phase involves using data descriptive of all of the search commands, or a substantial subset of all of the search commands, of the data intake and query system, and then using that data and multi-user historical search data to generate one or more operation flow models that represent all of the paths, or at least the most common paths, that a user can take in building a PSL search query. The preprocessing phase can be, but does not have to be, performed by the same system in which the guidance technique is applied at run time, which can be an instance of the data intake and query system 108, for example. Alternatively, the preprocessing phase can be performed by one or more computer systems other than those in which the guidance is applied at runtime. In some embodiments, the preprocessing is performed by a central (e.g., server) node and the runtime phase is performed by a remote (e.g., client) node of a distributed system.

The runtime phase, in certain embodiments, involves using one or more of the operation flow models to generate search guidance for a user of the data intake and query system dynamically, i.e., as the user is building a search query. As described above, a search query in the data intake and query system 108 is normally a pipelined sequence of search commands in a PSL, and typically has the form "[command_1][argument(s) of command_1 argument(s)] | [command_2] [argument(s) of command_2] | . . . [command_n] [argument(s) of command_n]" where n≥1. The search guidance may be in the form of recommending the next command, or a ranked list of possible next commands, for the user to append to the query. In some embodiments the search guidance may additionally or alternatively include a recommendation of which argument to select for one or more search commands.

Figure 5:
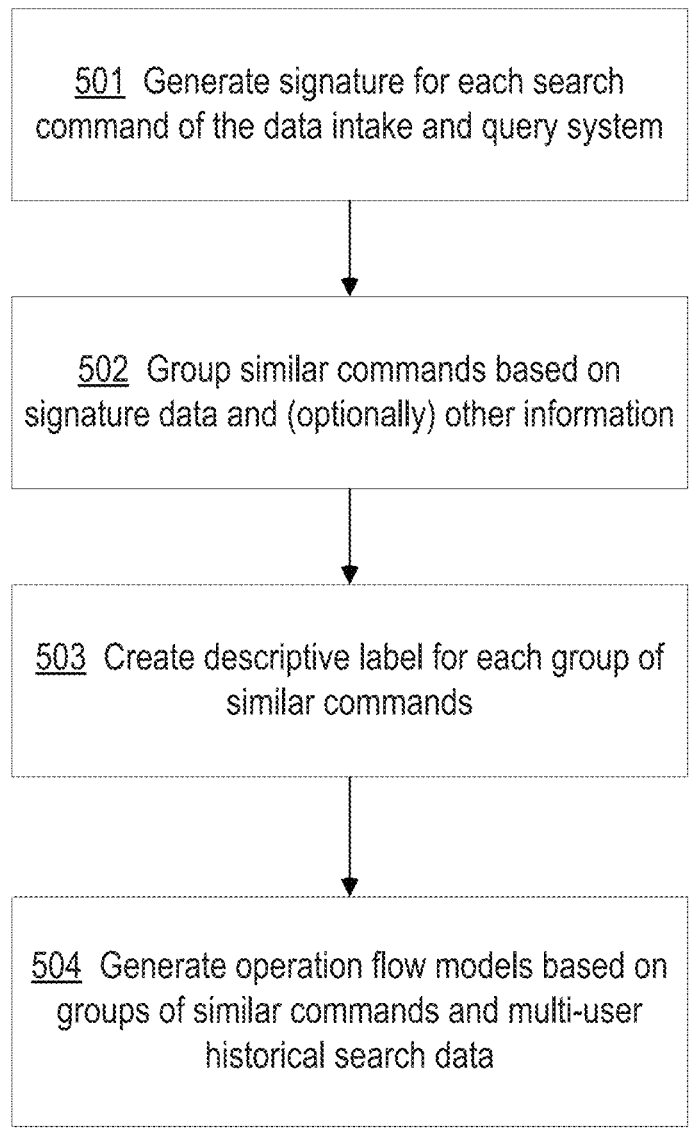
FIG. 5 is a flow diagram that illustrates an example process of the preprocessing phase of the guidance technique introduced herein.

FIG. 5 illustrates an example process of the preprocessing phase of the guidance technique introduced here, according to some embodiments. At step 501 the process generates and stores a signature for each (PSL) search command of the data intake and query system. A signature in this context can be any information that characterizes or is descriptive of a command for purposes of determining its degree of similarity to other commands of the system. In some embodiments, the signature of each command includes one or more classification parameters that characterize the command's low-level functionality. For example, the classification parameters might include the parameters isGenerating and isTransforming, each of which can have a value of true or false. A value of true for isGenerating means that the command performs some type of data generation functionality. Such commands may include, for example, any command that accesses and retrieves data, such as a read or lookup command. A value of true for isTransforming means that the command performs some type of transformation on data, and may include any command whose output data will not have the same content or format as its input data. Note that some commands may not fall into to either of these categories, and some commands may fall into both categories. The signature of a command may also include other information, such as the number and type of arguments the command has and/or information on specific data on which the command operates (e.g., known source types, schema, metadata).

In certain embodiments, the step 501 of generating and storing signatures for search commands is performed automatically by a computer system and may be accomplished by applying one or more machine learning (ML) models to the commands. For example, given a set of potential features as input, an ML algorithm for dimensionality reduction can help select which subset of features are relevant to creating signatures and how to weight the features to produce the unique signature. In other embodiments, this step 501 may be performed by a human (e.g., by inputting the signatures into a database on a computer).

After generating the signatures for the commands, at step 502 the process groups similar commands together, based on their signatures, and optionally based on other information. The degree of similarity required to consider any two or more commands to be part of the same group (and hence "related") can vary from one implementation to another. In certain embodiments the grouping step 502 is performed by a computer and may be accomplished by applying one or more machine learning (ML) algorithms, such as a clustering algorithm (e.g., k-means or agglomerative clustering), to the signature data. In other embodiments, the step may be performed by a human.

At step 503 the process creates a descriptive label for the category (operation) for each group of commands defined in step 502. Some possible examples of the operations (command groups) that may be defined and labeled in steps 502 and 503 are: filter (commands that filter an input data set), augment (commands that add data to an existing result set), report (commands that output a result set) and visualize (commands that generate graphical output of a result data set). Other categories are also conceivable. In some embodiments the descriptive labels of the categories are provided by human input to a computer. In other embodiments, the descriptive labels may be generated automatically by a computer program.

Next, at step 504 the process generates one or more operation flow models, based on the operations (categories) defined and labeled in steps 502 and 503, and based on multi-user historical search data. The multi-user historical search data can include actual past search queries (preferably a large number of them) submitted by different users. The actual past search queries are preferably from one or more users on a given instance of the same data intake and query system that will apply the search guidance at run time, and by one or more users on different instances of that data intake and query system, where the past search queries are in the same PSL that will be used by the data intake and query system at run time.

Figure 10:
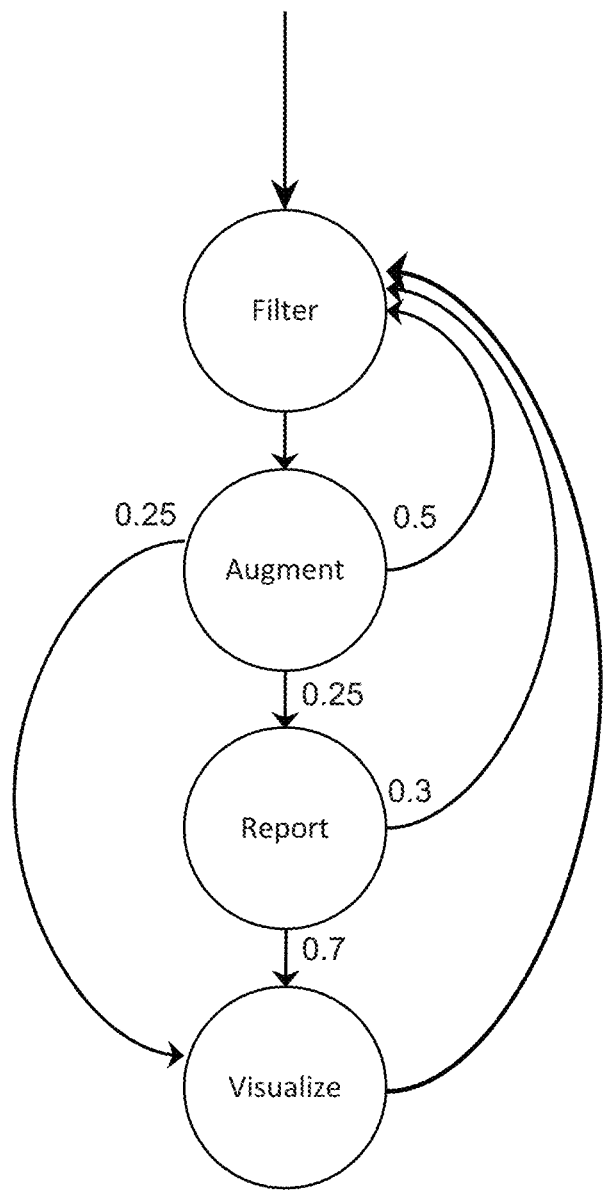
FIG. 10 shows an example of an operation flow graph that represents an operation flow model.

An operation flow model in this context is a dataset representing two or more states and the temporal or causal relationship(s) (transitions) between those states, i.e., an operation flow graph or state machine, where each state is one of the operations (categories, i.e., command groups) defined and labeled in steps 502 and 503. Each operation flow model represents at least one, and typically many, user-input search queries that have been performed (and therefore can be performed again) by the data intake and query system. In general, any given operation is represented no more than once in each operation flow model. FIG. 10 shows a simple example of an operation flow graph representing one such operation flow model. Many other possible operation flow models can be defined, which can be more complicated or simpler than that shown in FIG. 10. Some or all of the transitions between states (operations) can be weighted, as indicated by the numerical values next to the transition arrows in FIG. 10. The weightings can be based on, for example, the number of occurrences of the transitions relative to each other in the historical search query data, or any other relevant criteria.

In some embodiments, a separate operation flow model is generated for each unique data source type supported by the data intake and query system. Examples of data source types may include web access logs, router logs, Windows event logs, server event logs and clickstream data. Also, in some embodiments there can be a separate operation flow model for each user of the data intake and query system, based on his/her individual historical searches. In some embodiments, there may be a separate operation flow model for each one of various defined groups of users of an instance of the data intake and query system, or across groups of users interacting with similar data (e.g., a marketing team's operation flow model vs. a product group's operation flow model).

In some embodiments, this step of generating operation flow models is performed by a computer and may be accomplished by applying one or more ML algorithms to the defined grouping/operations and the multi-user historical search data, such as Hidden Markov model.

Figure 6:
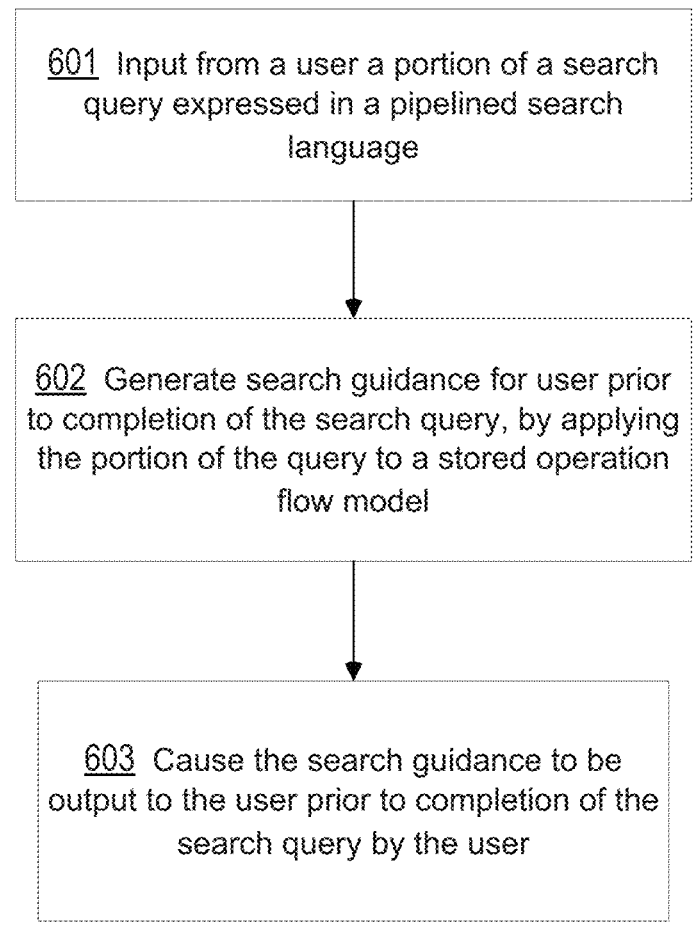
FIG. 6 is a flow diagram that illustrates an example process of the run time phase of the guidance technique.

FIG. 6 illustrates an example of the runtime phase of the guidance technique, according to some embodiments. As noted above, the process can be performed by a data intake and query system, such as system 108 in FIG. 2. Initially, at step 601 the process inputs from a user a portion of a search query (e.g., a PSL search command and one or more arguments of the command). In this context, a "portion" of a search query means at least one search command along with any associated argument(s) of the command(s) (if any), which collectively form less than the entire query that the user intends to submit, although such command(s)/ argument(s) may nonetheless be executable to retrieve data (due to the pipelined nature of the PSL). At step 602 the process generates search guidance for the user prior to the user's completion of the search query, by applying the inputted portion of the query to an appropriate one or more of the stored operation flow models generated during the preprocessing phase. In this context, a query is "complete" when the user ceases to append additional terms to the query. The search guidance can be in the form of one or more recommended next operations to add the query, which can be displayed to the user (e.g., in a pop-up drop-down menu), where each recommended next operation includes multiple selectable PSL commands. At step 603 the process causes the search guidance to be output to the user prior to completion of the search query by the user.

Figure 7:
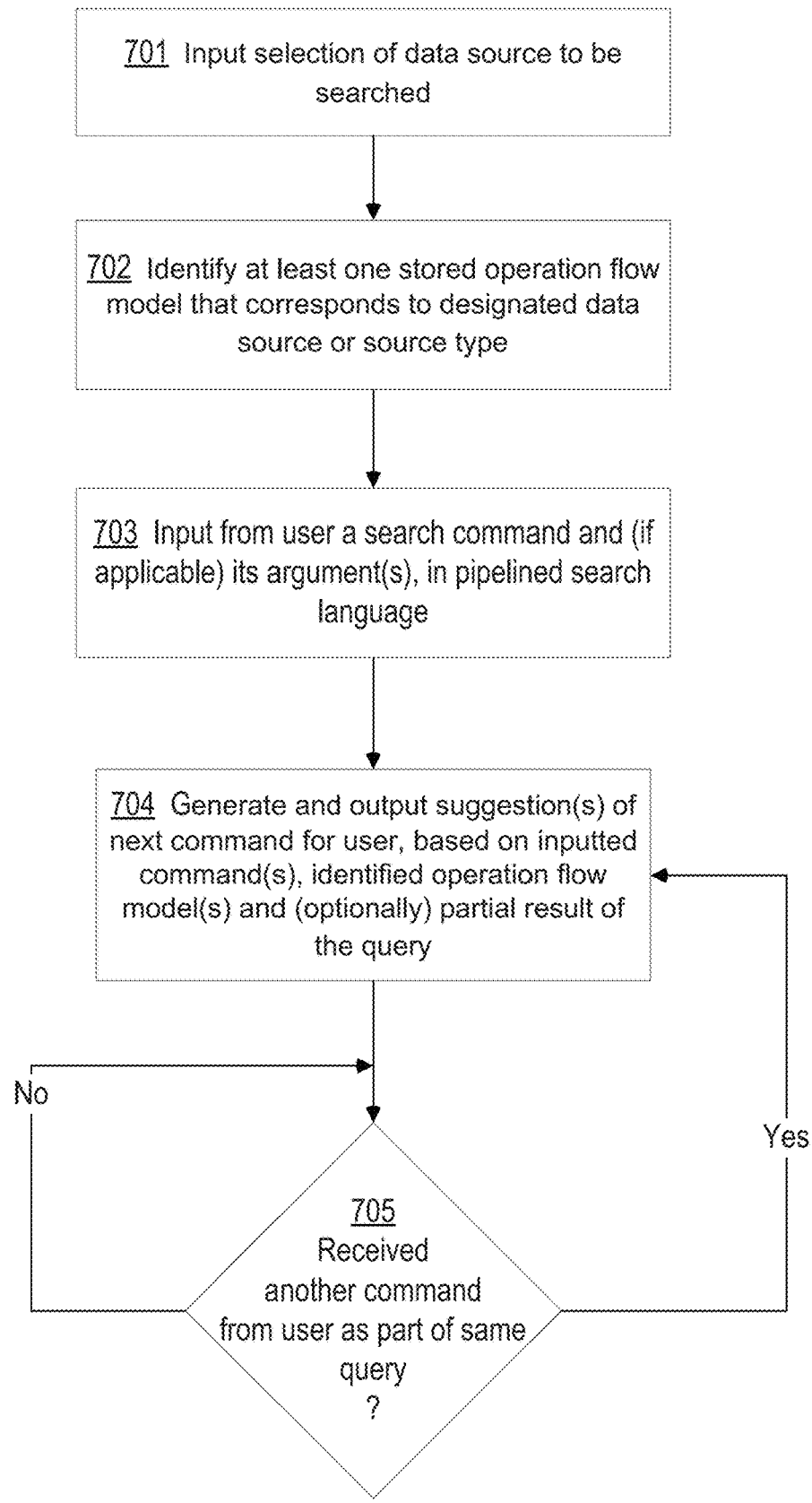
FIG. 7 is a flow diagram that illustrates a more detailed example process of the run time phase of the guidance technique.

FIG. 7 illustrates a more detailed example process of the runtime phase. At step 701 the process inputs from a user a selection of a data source to be searched, such as a particular file of indexed machine event data. Next, at step 702 the process identifies at least one stored operation flow model that corresponds to the selected data source or the source type of the selected data source (e.g., by matching on a keyword such as "source=" or "sourcetype="). The process then inputs from the user, at step 703, a search command and, if applicable, one or more arguments of the command, in PSL. At step 704 the process then generates and outputs one or more suggestions for the next operation and/or next command for the query, based on the search command(s) inputted thus far, the identified operation flow model(s) and (optionally) a partial result of the query. In this context, a "partial result" of a query is a result of a query that the user has not yet completed. The system 108 in at least some embodiments can access and retrieve stored data as a PSL query is being typed (or input in some other way), by using whichever search command/argument(s) have been fully typed thus far, and the results of that portion of the query can be provided to the user substantially instantly, before the user has finished typing the entire query. Another way of looking at this is that the user can type a short query (e.g., a single search command) that produces essentially instant results (the "partial results" in this context), and can then append one or more additional commands/arguments to the query to produce additional or modified results.

Hence, the recommended next operation can be based on a partial result of the query, and in particular on metadata in the partial result data set, such as the field types or specific fields (of field-value tuples) in the result data. For example, a result data set may include multiple fields of various types, such as numeric, categorical, string, etc., any of which may be useful in determining which operation should be suggested to the user as the next operation for the query. For example, if the result data includes the field "IP address," it may be desirable to recommend a command that makes use of the data in that field, as the next command, such as the iplocation or geolocation commands in Splunk Enterprise.

In some instances, two or more operation flow models are used to determine search guidance for a given query. In such cases, the process may vote across those two or more operation flow models to determine the suggested next operation, or to determine a ranking of the suggested next operations and/or corresponding commands. The criteria used in such a voting approach could be, for example, any of the following, or some variation thereof: 1) assign a higher weight to a model that includes data seen before on the same instance of the system; 2) assign a higher weight to a model based on the same data source type across many different instances; 3) assign a higher weight to a model based on more recent searches on a given instance of the system. Given a set of operation flow models and a voting policy specifying how to weight them, the recommendation order can be to simply sort them according to their weights.

Examples of how the output suggestions may appear are discussed below in relation to FIGS. 9A through 9C. The system may output to the user a ranked list of possible next operations and corresponding commands. The ranking may be based on any one or more of various factors, such as the weights of the corresponding transitions in the selected operation flow model, the user's own search history, deployment characteristics of the data intake and query system, the data source type, system load, metadata of the partial search results, etc.

Referring back to FIG. 7, if another search command is input from the user as part of same query, the process loops back to step 704 as described above. Otherwise, no action is taken. In some embodiments, rather than waiting for the user to input the next PSL command, the system may determine and execute the expected next command in an anticipatory manner and generate corresponding reports and visualizations on the fly, so as to improve (from the user's perspective) the speed at which results are generated.

Figure 8A:
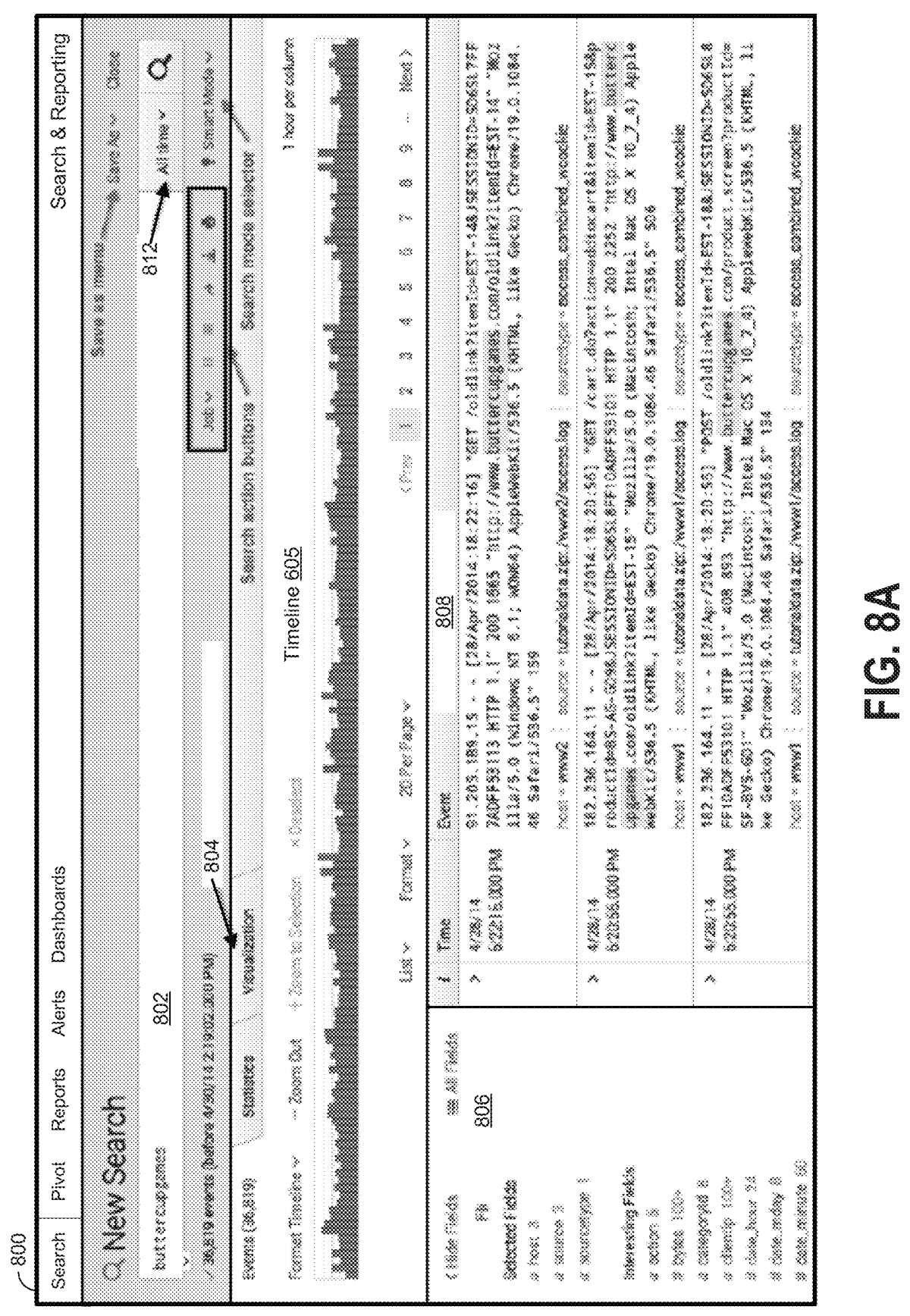

Additional examples are now described with reference to FIGS. 8A through 10. FIG. 8A shows an example of a search screen that may be generated by the search head 210 of data intake and query system 108. Search screen 800 includes a search bar 802 that accepts a user-input search query in the form of a search string (e.g., the string "buttercupgames" in the example of FIG. 8A). The search string can be in the form of a PSL query, although it is not shown as such in FIG. 8A.

Figure 8B:
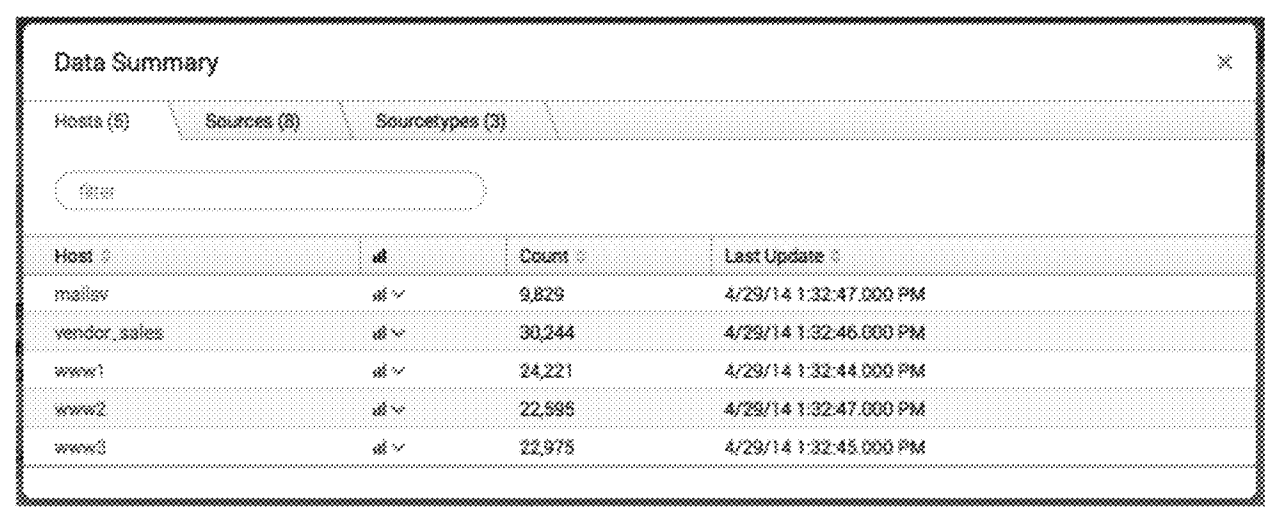

Search screen 800 also includes a time range picker 812 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 800 also initially displays a "data summary" dialog as is illustrated in FIG. 8B that enables the user to select from among different data sources for the event data, such as by selecting specific hosts and log files. In other cases, the data source may be selected via a command that is part of the search query itself, as described below.

After a search is executed, the search screen 800 in FIG. 8A can display the results through search results tabs 804, wherein search results tabs 804 includes: an "events tab" that displays various information about events returned by the search; a "statistics tab" that displays statistics about the search results; and a "visualization tab" that displays various visualizations of the search results. The events tab illustrated in FIG. 8A displays a timeline graph 805 that graphically illustrates the number of events that occurred in one-hour intervals over the selected time range. It also displays an events list 808 that enables a user to view the raw data in each of the returned events. It additionally displays a fields sidebar 806 that includes statistics about occurrences of specific fields in the returned events, including "selected fields" that are pre-selected by the user, and "interesting fields" that are automatically selected by the system based on pre-specified criteria.

Figure 9C:
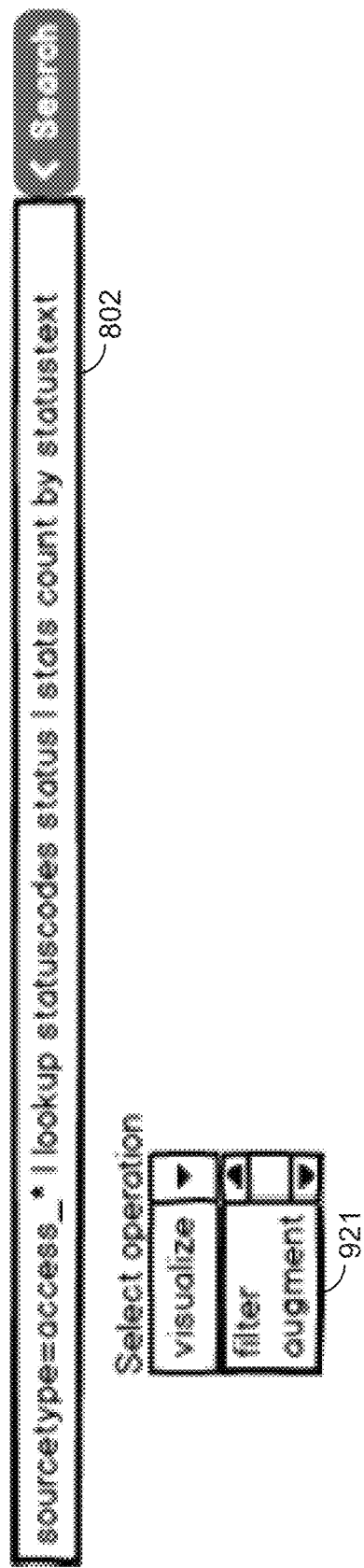
FIG. 9C shows an example of a third search screen display including dynamic search guidance for the user.

FIGS. 9A through 9C show examples of how search guidance such as discussed above may be output to the user. In FIG. 9A, a user has input part of a search query into the search bar 802. The user has initially entered the SPL command, "sourcetype=," which has the argument "access_*" in this example, to select a particular data source type and begin the pipeline search query. In response to this input, the system generates and outputs search guidance in the form of three pop-up drop-down menus, i.e., menus 901, 902 and 903, by using the technique described above. In some embodiments, menus 901 through 903 might be displayed concurrently, while in other embodiments they might be displayed sequentially.

In response to the user inputting the terms "sourcetype=access_*" followed by the pipe symbol ("|") into the search bar 800, the system accesses one or more of the above-mentioned operation flow models (e.g., the operation flow model associated with the selected data source type, "access_*") to determine which operations (groups of commands) can be performed next in the query. The accessed operation flow model(s) may include one or more models substantially identical or similar to that shown in the example of FIG. 10, although they could be significantly different and/or more complex than that, depending on the number of operations defined during the preprocessing phase and their relationships to each other. The system then displays menu 901, which indicates that the possible next operations from the accessed operation flow model in this example include filter results, report, augment results and visualize.

In the example of FIG. 9A, the user then selects "augment results" (shown highlighted), which causes the system to display drop-down menu 902, showing all of the PSL commands that are included within the augment results operation. In this example those commands include eval, lookup, eventstats and delta (the specific purposes/functions of these commands are not germane to this description). If the user instead selected a different operation from menu 901, the contents of menu 902 would be different. The user then selects the lookup command in this example, which causes menu 903 to pop up, containing the various types of lookups that can be performed, e.g., statuscodes, dnslookup or names. Thus, the system displays search guidance to the user in the form of a hierarchically related set of drop-down menus containing suggested next operations and commands.

To select a suggested command, the user can simply click on the command (or select it in some other conventional manner) from the drop-down menu, which causes the command to be appended to the search query in the search bar 800. FIG. 9B shows how the screen might appear after the user has selected the lookup statuscodes command (with argument, "status") and input the "|" symbol. In response to this action, the system again accesses the appropriate operation flow model(s) to determine which operation(s) to recommend next, given the "current" command (i.e., most recently appended command). Those operations are displayed in menu 911. In this example it is the same set of operations as in FIG. 9A, although that may not be so in every situation. Here the default operation, report, is selected, which causes menu 912 to display the SPL commands included under the report operation, namely, stats, timechart and top (the specific purposes of these commands is not germane to this description). The command, stats, is currently selected, which causes menu 913 to display all of the functions associated with that command. The function "count" is shown selected, which causes menu 914 to display the possible parameters by which the search results can be grouped.

FIG. 9C shows how the screen might appear after the user has selected the stats command (with arguments, "status") per FIG. 9B and input the "|" symbol. In response to this action, the system again accesses the appropriate operation flow model(s) to determine which operation(s) to recommend next, given the "current" command (i.e., most recently appended command). Those operations are displayed in menu 921 and include visualize, filter and augment.

Figure 11:
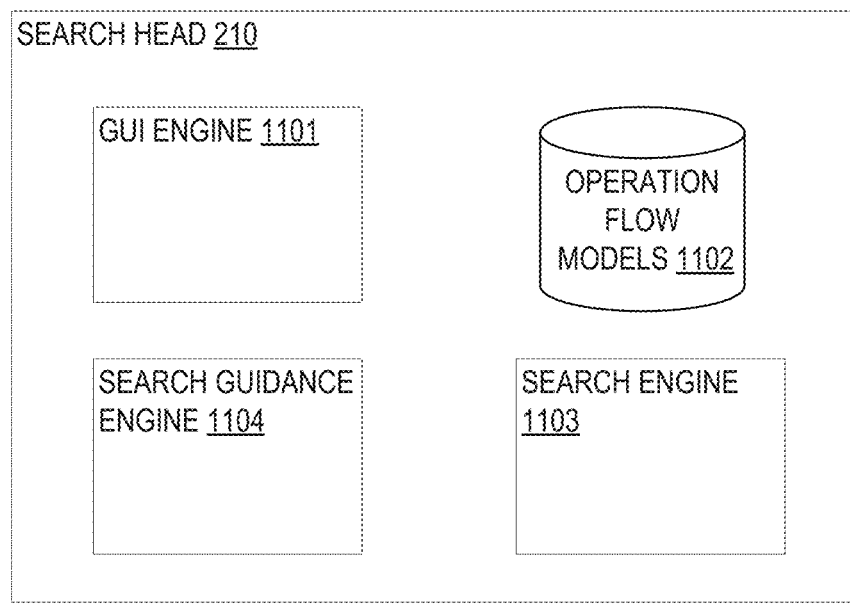
FIG. 11 is a block diagram showing an example of the functional elements of the search head of the data intake and query system.

FIG. 11 is a block diagram showing functional elements of the search head 210 of the data intake and query system 108, according to some embodiments. As shown, the search head 210 includes a GUI engine 1101, one or more operation flow models 1102, a search guidance engine 1103 and a search engine 1104. The GUI engine 1101 can include or cooperate with a browser and is responsible for generating various GUI input and output features (e.g., as menus, user input fields, data listings (e.g., display of search results), graphical displays and other images, basic instructions for the user, etc.), such as those shown in FIGS. 8A through 9C. The operation flow models 1102, as described above, are data sets that represent the various operations (groups of commands) that can be performed by the data intake and query system 108 and the logical relationships between those operations. The search engine 1103 inputs various PSL queries input by a user via the search GUI, executes the queries against data previously processed by the data intake and query system 108, and returns the results to the GUI engine 1101, for output to the user. The search guidance engine 1104 is responsible for generating and providing search guidance to the user dynamically, via the GUI, such as in the form of recommended next operations and commands for a given partial query.

Although the guidance technique introduced here is described primarily in relation to guiding a user through search and analysis of data, it can alternatively or additionally be applied for other purposes, such as to optimize a search GUI or to optimize the PSL itself. For example, to improve the search GUI, in the preprocessing phase the system can also track multi-user historical clickstream information indicative of what activities various users have performed in the search GUI (e.g., a particular user scrolled down results, clicked on then updated the search, then clicked on a different chart to visualize, etc.). The multi-user clickstream data can be interleaved with the multi-user historical search query data (e.g., by correlation based on timestamps) as inputs to one or more ML algorithms, to generate operation flow similar to those described above, but in this example more indicative of detailed sequences of user interactions. Those operation flow models, in turn, can be used by a software developer to inform his/her decisions about how to create a more efficient or more user-friendly GUI, such as by more efficient placement of controls and displays, or to create new controls, based on the historical data.

As another example, the operation flow models might indicate that the same pattern of consecutive commands shows up in many different queries. Based on that knowledge, a software developer might determine that it is advantageous to create a new search command that combines those commands into a single command, to enable more efficient searches. For example, suppose that the following sequence of PSL commands is found to appear frequently in the multi-user historical search data: "| stats count by user | eventstats sum(count) as total | eval percentage=100*count/total." In that case, a developer might decide to create a new command called "percentoftotal," that performs the combined functionality of eventstats and eval (in that order), given the fieldname "count" as input.

FIG. 12 shows a high-level example of a hardware architecture of a processing system that can be used to implement any one or more of the functional components referred to above (e.g., the tool, forwarders, indexer, search head, data store). One or multiple instances of an architecture such as shown in FIG. 12 (e.g., multiple computers) can be used to implement the techniques described herein, where multiple such instances can be coupled to each other via one or more networks.

The illustrated processing system 1200 includes one or more processors 1210, one or more memories 1211, one or more communication device(s) 1212, one or more input/output (I/O) devices 1213, and one or more mass storage devices 1214, all coupled to each other through an interconnect 1215. The interconnect 1215 may be or include one or more conductive traces, buses, point-to-point connections, controllers, adapters and/or other conventional connection devices. Each processor 1210 controls, at least in part, the overall operation of the processing device 1200 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 1211 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 1214 can be or include one or more hard drives, digital versatile disks (DVDs), flash memories, or the like. Each memory 1211 and/or mass storage 1214 can store (individually or collectively) data and instructions that configure the processor(s) 1210 to execute operations to implement the techniques described above. Each communication device 1212 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 1200, each I/O device 1213 can be or include a device such as a display (which may be a touch screen display), audio speaker, keyboard, mouse or other pointing device, microphone, camera, etc. Note, however, that such I/O devices may be unnecessary if the processing device 1200 is embodied solely as a server computer.

In the case of a user device, a communication device 1212 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 1212 can be or include, for example, any of the aforementioned types of communication devices, a wired Ethernet adapter, cable modem, DSL modem, or the like, or a combination of such devices.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   inputting from a user a portion of a search query expressed in a pipelined search language, at a system for indexing and searching machine data;
   generating, by the system for indexing and searching machine data, search guidance for the user prior to completion of the search query by the user, by applying the portion of the query to an operation flow model, the operation flow model including a plurality of states and representing a plurality of searches performable by the system for indexing and searching machine data, each state in the operation flow model representing a different group of related commands of the pipelined search language, the operation flow model having been generated based on multi-user historical search data, wherein generating the search guidance for the user includes determining a most probable next state of the search query based on the operation flow model as the user builds the search query and based on a field-value pair in a result of executing the portion of the search query, and wherein generating the search guidance for the user further includes
      determining, by the system for indexing and searching machine data, that the result of executing the portion of the search query includes a particular field of a field-value pair, and
      in response to the result of executing the portion of the search query including the particular field of the field-value pair, recommending, by the system for indexing and searching machine data, to the user a command that makes use of the particular field-value pair, as a next command to include in the search query; and
   causing, by the system for indexing and searching machine data, the search guidance to be output to the user prior to completion of the search query by the user.

2. The method of claim 1, wherein the portion of the search query comprises a command and an argument of the command.

3. The method of claim 1, further comprising:
   selecting the operation flow model from among a plurality of stored operation flow models, in response to the inputting of the portion of the search query.

4. The method of claim 1, further comprising:
   selecting the operation flow model from among a plurality of stored operation flow models, in response to the inputting of the portion of the search query, wherein the search query specifies a search of a data source of machine data, and the operation flow model is specific to the data source.

5. The method of claim 1, further comprising:
identifying a data source specified by the search query; and
selecting the operation flow model from among a plurality of stored operation flow models, based on the data source specified by the search query, each of the plurality of stored operation flow models corresponding to a different one of a plurality of data source types.

6. The method of claim 1, wherein:
the multi-user historical search data comprises past search queries submitted by a plurality of users on one or more instances of the system for indexing and searching machine data;
the operation flow model includes a plurality of transitions, each transition representing a relationship between two of the plurality of states; and
at least some of the transitions are weighted according to their frequencies of occurrence in the multi-user historical search data.

7. The method of claim 1, wherein the operation flow model includes a plurality of transitions, each transition representing a relationship between two of the plurality of states, and wherein at least some of the transitions are weighted according to their frequencies of occurrence in the multi-user historical search data.

8. The method of claim 1, wherein each state in the operation flow model represents a group of related but independently executable pipelined search language commands of the system for indexing and searching machine data.

9. The method of claim 1, wherein:
each state in the operation flow model represents a group of related but independently executable pipelined search language commands of the system for indexing and searching machine data; and
the plurality of states are defined such that at least one of the following is true:
all of the pipelined search language commands of each state are of the same or similar type;
all of the pipelined search language commands of each state have the same or similar types of arguments; or
all of the pipelined search language commands of each state have the same or similar numbers of arguments.

10. The method of claim 1, wherein said generating search guidance for the user comprises determining a most probable next state of the search query based on the operation flow model, as the user builds the search query.

11. The method of claim 1, wherein:
said generating search guidance for the user comprises determining a most probable next state of the search query based on the operation flow model, as the user builds the search query;
the most probable next state of the search query represents a subset of all search commands of the pipelined search language; and
said generating search guidance for the user further comprises causing an indication of the commands of said subset to be output to the user as the user builds the search query.

12. The method of claim 1, wherein:
said operation flow model is one of a plurality of stored operation flow models, each of the operation flow models representing a different plurality of searches performable by the system for indexing and searching machine data; and
said generating search guidance for the user is based on the plurality of operation flow models.

13. The method of claim 1, wherein:
said operation flow model is one of a plurality of stored operation flow models, each of the operation flow models representing a different plurality of searches performable by the system for indexing and searching machine data; and
said generating search guidance for the user comprises voting across the plurality of operation flow models to determine the search guidance.

14. The method of claim 1, wherein said generating search guidance for the user comprises determining a plurality of most probable next states of the search query based on the operation flow model, as the user builds the search query, each of the determined most probable next states representing a different subset of all commands of the pipelined search language.

15. The method of claim 1, wherein:
said generating search guidance for the user comprises determining a plurality of most probable next states of the search query based on the operation flow model, as the user builds the search query, each of the determined most probable next states representing a different subset of all commands of the pipelined search language;
said generating search guidance for the user further comprises causing an indication of the plurality of most probable next states to be output to the user as the user builds the search query;
the method further comprising:
receiving user input directed to one of the most probable next states in the indication; and
in response to the user input, causing output to the user of an indication of the pipelined search language commands represented by said one of the most probable next states.

16. The method of claim 1, further comprising:
generating the operation flow model by executing a machine-learning algorithm.

17. The method of claim 1, further comprising:
generating a plurality of operation flow models, including said operation flow model, each of the plurality of operation flow models representing a different plurality of searches performable by the system for indexing and searching machine data, based on the multi-user historical search data.

18. The method of claim 1, further comprising:
generating a plurality of operation flow models, including said operation flow model, each of the plurality of operation flow models representing a different plurality of searches performable by the system for indexing and searching machine data, based on the multi-user historical search data;
wherein said generating a plurality of operation flow models comprises applying a machine learning algorithm to the multiuser historical search data.

19. The method of claim 1, further comprising:
defining, by a computer system, the plurality of states of the operation flow model based on stored signature data of a plurality of pipelined search language commands of the system for indexing and searching machine data.

20. The method of claim 1, further comprising:
defining, by a computer system, the plurality of states of the operation flow model based on stored signature data of a plurality of pipelined search language commands of the system for indexing and searching machine data;

wherein defining the plurality of states is performed by applying a machine learning algorithm to the signature data.

21. The method of claim 1, further comprising:

defining, by a computer system, the plurality of states of the operation flow model based on stored signature data of a plurality of pipelined search language commands of the system for indexing and searching machine data; and generating the operation flow model by executing a machine-learning algorithm.

22. The method of claim 1, further comprising:

defining the plurality of states of the operation flow model by applying a first machine learning algorithm to stored signature data of a plurality of pipelined search language commands of the system for indexing and searching machine data; and generating the operation flow model by applying a second machine-learning algorithm to the plurality of states and the multi-user historical search data.

23. The method of claim 1, further comprising:

defining states of a plurality of operation flow models by applying a first machine learning algorithm to stored signature data of a plurality of pipelined search language commands of the system for indexing and searching machine data, each of the plurality of operation flow models representing a different plurality of possible searches by the system for indexing and searching machine data; and generating the plurality of operation flow models by applying a second machine-learning algorithm to the defined states and the multi-user historical search data.

24. A system for indexing and searching machine data, the system comprising:

a communication device through which to communicate on a computer network; and at least one processor operatively coupled to the communication device and configured to execute operations including inputting from a user a portion of a search query in a pipelined search language of the system for indexing and searching machine data;

generating search guidance for the user prior to completion of the search query by the user, by applying the portion of the query to an operation flow model, the operation flow model including a plurality of states and representing a plurality of searches performable by the system for indexing and searching machine data, each state representing a different group of related commands of the pipelined search language, the operation flow model having been generated based on multi-user historical search data, wherein generating the search guidance for the user includes determining a most probable next state of the search query based on the operation flow model as the user builds the search query and based on a field-value pair in a result of executing the portion of the search query, and wherein generating the search guidance for the user further includes determining, by the system for indexing and searching machine data, that the result of executing the portion of the search query includes a particular field of a field-value pair, and in response to the result of executing the portion of the search query including the particular field of the field-value pair, recommending, by the system for indexing and searching machine data, to the user a command that makes use of the particular field-value pair, as a next command to include in the search query; and causing the search guidance to be output to the user prior to completion of the search query by the user.

25. A non-transitory machine-readable storage medium for use in a processing system, the non-transitory machine-readable storage medium storing instructions, an execution of which in the processing system causes the processing system to perform operations comprising:

inputting from a user a portion of a search query expressed in a pipelined search language of a system for indexing and searching machine data;

generating search guidance for the user prior to completion of the search query by the user, by applying the portion of the query to an operation flow model, the operation flow model including a plurality of states and representing a plurality of searches performable by the system for indexing and searching machine data, each state representing a different group of related commands of the pipelined search language, the operation flow model having been generated based on multi-user historical search data, wherein generating the search guidance for the user includes determining a most probable next state of the search query based on the operation flow model as the user builds the search query and based on a field-value pair in a result of executing the portion of the search query, and wherein generating the search guidance for the user further includes determining, by the system for indexing and searching machine data, that the result of executing the portion of the search query includes a particular field of a field-value pair, and in response to the result of executing the portion of the search query including the particular field of the field-value pair, recommending, by the system for indexing and searching machine data, to the user a command that makes use of the particular field-value pair, as a next command to include in the search query; and causing the search guidance to be output to the user prior to completion of the search query by the user.

* * * * *